(Model.)
G. DUNHAM.
DIE FOR CUTTING HEXAGONAL NUTS.
No. 324,756. Patented Aug. 18, 1885.
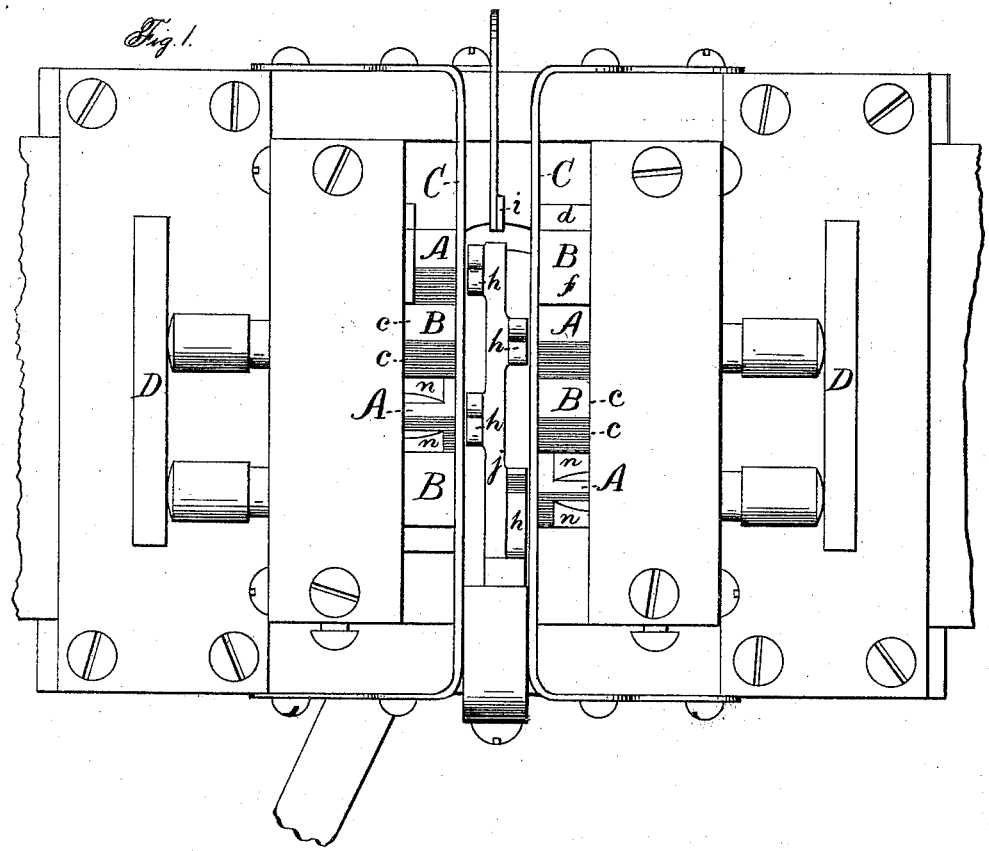
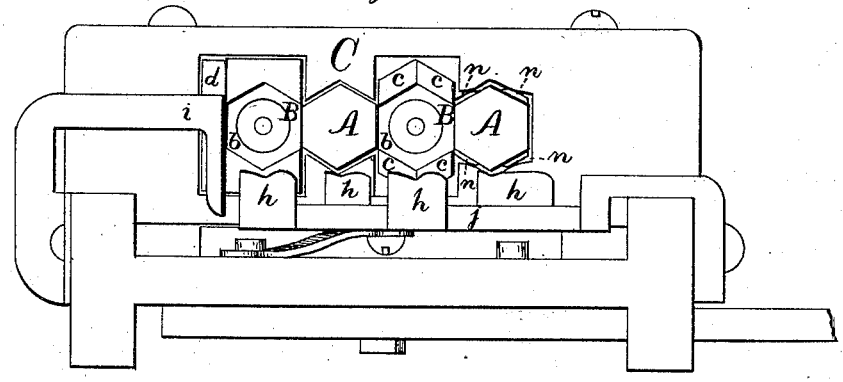
Witnesses
John Edwards Jr.
L. F. Burr
Inventor,
George Dunham
By James Shepard
Atty (Model.)
2 Sheets—Sheet 2.
G. DUNHAM.
DIE FOR CUTTING HEXAGONAL NUTS.
No. 324,756. Patented Aug. 18, 1885.
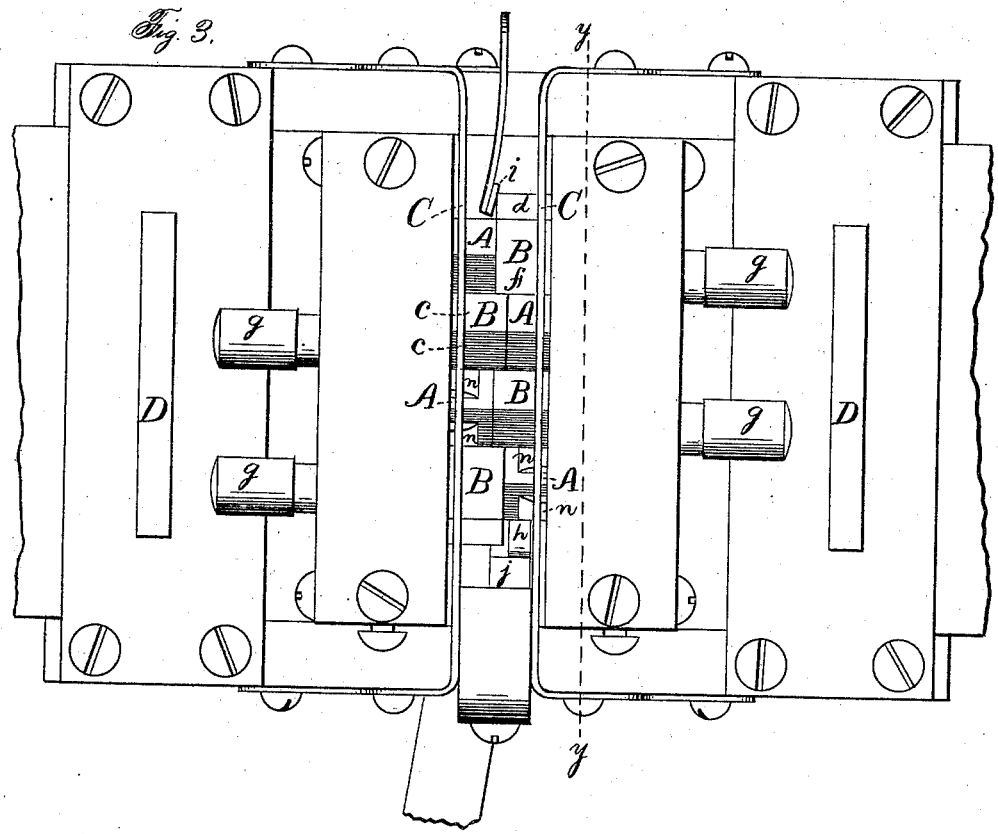
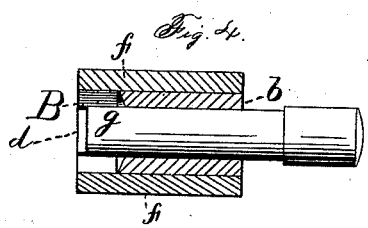
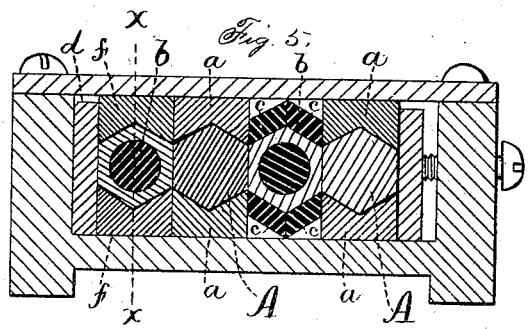
Witnesses.
John Edwards Jr.
L. T. Burr
Inventor.
George Dunham
By James Shepard
Atty.

UNITED STATES PATENT OFFICE.

GEORGE DUNHAM, OF UNIONVILLE, CONNECTICUT, ASSIGNOR TO CARL B. ANDERSON, OF SAME PLACE.

DIE FOR CUTTING HEXAGONAL NUTS.

SPECIFICATION forming part of Letters Patent No. 324,756, dated August 18, 1885.

Application filed June 20, 1881. (Model.)

*To all whom it may concern:*

Be it known that I, GEORGE DUNHAM, of Unionville, in the county of Hartford and State of Connecticut, have invented certain new and useful Improvements in Dies for Cutting Hexagonal Nuts, of which the following is a specification.

My invention relates to improvements in dies for cutting hexagonal nuts. In my improved dies two or more such nuts are cut at one time without waste in the length of the bar, and one side of the male die or punch also forms one side of the female die; and some of the objects of my improvements are the more expeditious cutting of hexagonal nuts without waste in the length of the bar, and to so construct and arrange the parts pertaining to the dies that they may work better, be more durable, and that hexagonal nuts may be produced more economically than heretofore. I attain these objects by the mechanism illustrated in the accompanying drawings, in which—

Figure 1 is a plan view. Fig. 2 is a side elevation of one-half of the dies. Fig. 3 is a plan view. Fig. 4 is a vertical section of one of the female dies on line $x\,x$ of Fig. 5. Fig. 5 is a vertical section on line $y\,y$ of Fig. 3, and Fig. 6 is a diagram illustrating the scrap cut from one side of the bar.

A designates the male dies, and B the female dies. These are arranged alternately side by side, and in pairs facing each other, so as to cut two or more nuts at one time from a bar of the proper width. I have shown four pairs of these dies in the drawings, arranged to move to and from each other in right lines; but any other desired number may be employed. I intend, also, to place these dies on the periphery of two wheels or heads set so close together that the respective male and female dies are brought into cutting action by the revolution or partial revolution of the heads. Dies thus arranged for cutting two sides of square nuts, or rather cutting a straight bar into short pieces, are old. The means for reciprocating the dies constitute no part of my invention, and therefore are not herein described. It is, however, essential that the male dies shall be brought or forced into the female dies; but it is immaterial by what means this shall be accomplished.

I so arrange the dies that there will be no waste in the length of the bar from which the nuts are cut, and this is best accomplished by placing the dies so as to cut two faces of each nut at right angles to the length of the bar, which position of the dies is represented in Figs. 2 and 5; but, if desired, they may be placed with the angles of the nuts facing each other, and with two sides of the nut parallel to the length of the bar from which they are cut.

I form the dies of separate blocks of the proper length and clamp them together in a suitable frame or die-box. The male dies or punches A are first formed in hexagonal prisms, and they are maintained in proper position by angle-blocks $a\,a$, as shown in Fig. 5. A similar prism, $b$, but of less length than the punches A, forms the central support for the pieces which constitute the female die. The cutting-edges of the female dies are formed upon their vertical edges by the adjoining male punches, except the outer side of the end die, which is formed by a plain block, $d$. I form the other four edges by blocks $c\,c\,c\,c$, the sides of which are formed at angles of sixty and one hundred and twenty degrees to each other, as shown in Figs. 2 and 5. These blocks are all just alike, and can be changed so as to bring their longest corners at either end toward the front to form the cutting-edge of the female die, thereby bringing four different edges of each block into action before it is necessary to sharpen the blocks. These pieces or blocks $c$ are governed in their position and supported by the central prism, $b$. These oblique edges of the female die may, if desired, be formed by angle-blocks $f\,f$, similar in form to the blocks $a\,a$, all as shown in Fig. 5. For the purpose of rounding, or "crowning," as it is called, the sides of the nuts, (which are intended to be cut while hot,) I hollow the end of each central block or prism, $b$, of the female dies B, as shown in Fig. 4. These central blocks, $b$, are bored out to receive the knock-outs $g$, which lie loosely therein. When the dies are forced back away from each other, the knock-outs g are acted upon by the stationary abutments D D to force the nuts out of the female dies.

In Fig. 1 the dies are represented as opened—that is, moved away from each other—and in Fig. 3 they are represented as closed, or with the male dies just entered within the mouths of the female dies.

h h h h designate gage-wings placed between the dies, the upper surfaces of which wings are for gaging the edge of the bar, and i designates the yielding gage for gaging the end of the bar. The wings h are all connected together by a common body, j, and they are alternately set to the right and left of said body, in order to allow room for the female dies to advance; but the space between them, measured transversely to the body j, should always be less than the thickness of the bar from which the nuts are to be cut, so that said bar will always be held upward by the upper ends of said wings. The gage i is made of thin metal, so as to give or yield to one side under pressure of the dies, as shown in Fig. 3, and immediately return to its former position upon the return movement of the dies, so as to be in position to stop and gage the end of the rod, as shown in Figs. 1 and 2.

A pivoted yielding gage held in place by a spring may be substituted for the thin metal gage as an equivalent.

Stripper-plates C C are secured to some stationary part of the main frame, one upon each side of the gage body and wings j h, and they should be so fitted as to come near the sides of the male punches to strip the surplus metal therefrom, and must also be perforated sufficiently to allow the female dies to readily pass through them.

In order to facilitate the removal of the scrap or waste, and also to somewhat protect the corners at the junction of the male and female dies, I employ wedge-shaped lifters n n on four sides of the male dies, the same being set a little back from the cutting end, as shown, upon two of the male dies in Figs. 1 and 3, and upon one male die in Fig. 2. These may be the most readily held in place by forming them on the front ends of the blocks a a, and integral therewith.

In cutting nuts from a bar two adjoining nuts are forced in opposite directions, and also two adjoining pieces of scrap—that is to say, the punches A force the nuts cut out into the dies B—and inasmuch as there are dies B upon both sides the nuts are forced in opposite directions. Simultaneously with this cutting out of the nuts the block bearing the female dies upon one side enters into the spaces between corresponding die-blocks upon the opposite side, and in doing so severs the scrap upon the meeting vertical edges or walls of said blocks, and part of it is forced in one direction by the female-die blocks upon one side, and the remainder is forced in the opposite direction by the female-die blocks upon the opposite side. In Fig. 6 the full lines designate the scrap which is forced in one direction, and the broken lines that which is forced in the opposite direction, said scrap being cut in two by vertical cuts which are in line with the cutting-edges of the dies. These cuts are made by the vertical walls of the upper and lower blocks of the respective female dies. When the male dies enter the female dies to cut a nut, the points of the wedge-shaped lifters n n are entered under the edges of the scrap and start the same away from the punches, so that when the punches or male dies are withdrawn the scrap will not stick to them, but will readily fall therefrom. The nuts cut by these dies I intend to hammer or press while hot; and to this end the dies may be arranged in a proper machine for thus pressing the nuts while hot as fast as they are cut by the dies. I have herein used the term "vertical" in describing certain parts; but I mean no more by that term than the relation of those parts to the others, as herein shown.

I am aware that dies have been arranged to cut a bar of iron into square-nut blanks by transverse cuts, and forcing two adjoining blanks in opposite directions without waste in the length of the bar, and the same is hereby disclaimed. In my hexagonal dies provision has to be made for the disposition of the scrap, which is entirely different from anything found in connection with the dies for cutting square nuts.

I am aware that a prior patent shows round dies having tapering sides, a flat bottom, and a knock-out extending through said bottom, the same being used for swaging the ordinary form of eyelets, and I hereby disclaim the same.

I am also aware that a prior patent shows dies arranged in pairs, all cutting one way, for cutting a series of angular flattened V-shaped notches in the side edges of the bar, which bar so notched was afterward made into hexagonal-nut blanks without waste in the length of the bar, by merely severing it at right angles to its length at points upon lines extending from the bottom of one V-shaped notch to the bottom of the V-shaped notch directly opposite thereto, and the same is hereby disclaimed.

I am also aware that a prior patent shows a die-block composed of two halves recessed upon their confronting faces, and provided with dowels to make the die-recesses in said halves properly register with each other; that in connection with said hexagonal die-recesses in said block a hexagonal prism is employed to form a bottom to the die-recesses, and the same is hereby disclaimed.

I claim as my invention—

1. The pairs of hexagonal dies placed side by side and face to face, so as to carry the metal cut by them in opposite directions, and adapted to form the six sides of each of two or more hexagonal nuts from a straight bar by a single blow without waste in the length of the bar from which said nuts are cut, said dies also having confronting cutting-edges for severing the scrap on lines which form a continuation of the cuts between two adjoining nuts thus formed, substantially as herein described, and for the purpose specified.

2. The pairs of hexagonal dies placed face to face and side by side, with one-sixth of the cutting-edge of one male die forming also one-sixth of the cutting-edge of the adjoining female die, substantially as described, and for the purpose specified.

3. The female dies B, constructed of a central hexagonal prism and several surrounding blocks governed in their position and supported by said prism, substantially as described, and for the purpose specified.

4. The female die B, having one or two of its sides formed by the adjoining male die or dies, and four of its sides formed by blocks, substantially as described, and for the purpose specified.

5. The hexagonal dies set in pairs for cutting nuts from a straight bar of metal, and also having edges for cutting the scrap in two, whereby the waste cut from one nut is carried in the opposite direction from that of the waste cut from the adjoining nut, substantially as described, and for the purpose specified.

6. The pairs of hexagonal dies placed face to face and side by side, in combination with the stripper-plates C C, having alternate small and large perforations for the male and female dies, respectively, and adapted to receive the bar to be cut between them, substantially as described, and for the purpose specified.

7. The gage for the edge of the bar to be cut, formed by the upper surface of the wings $h\,h$, set alternately to the right and left, substantially as described, and for the purpose specified.

8. The gage for the edge of the bar, consisting of the wings $h$ and body $j$, the alternating wings being connected by said body, substantially as described, and for the purpose specified.

9. In hexagonal dies, the scrap-lifters $n\,n$, placed on the sides of the male die back of its edge, substantially as described, and for the purpose specified.

10. In hexagonal dies placed in pairs, the combination of the adjoining male and female dies with the scrap-lifters $n$, placed in the adjoining corners, substantially as described, and for the purpose specified.

11. The combination of the stripper-plates C C, pairs of hexagonal dies, and the gage $h\,j$, substantially as described, and for the purpose specified.

12. The pairs of hexagonal dies, in combination with the gage $h\,j$ and yielding end gage, $i$, substantially as described, and for the purpose specified.

13. The combination of the pairs of hexagonal dies, the stripper-plates C C, the gage $h\,j$, and end gage, $i$, substantially as described, and for the purpose specified.

GEORGE DUNHAM.

Witnesses:
 JOHN RUSSELL,
 CARLOS L. MASON.